United States Patent [19]

Gaynor

[11] 3,795,009

[45] Feb. 26, 1974

[54] INFORMATION RECORDING METHODS, APPARATUS AND MEDIA USING DEFORMABLE MAGNETIZED MATERIALS

[75] Inventor: Joseph Gaynor, Arcadia, Calif.

[73] Assignee: Bell & Howell Company, Chicago, Ill.

[22] Filed: June 17, 1970

[21] Appl. No.: 47,064

[52] U.S. Cl. ...... 346/74 M, 340/173 TP, 346/74 TP

[51] Int. Cl. .......................... G11b 7/00, H04n 5/82

[58] Field of Search .........346/74 M, 74 MP, 74 TP, 346/74 ES, 77 E; 178/6.6 TP; 340/173 TP

[56] References Cited

UNITED STATES PATENTS

| | | | |
|---|---|---|---|
| 1,889,380 | 11/1932 | Ruben | 179/100.2 A |
| 2,856,284 | 10/1958 | Hamm | 346/74 M |
| 3,317,316 | 5/1967 | Bean et al. | 346/74 TP |
| 3,262,122 | 7/1966 | Fleisher et al. | 340/173 TP R |
| 3,250,636 | 5/1966 | Wilferth | 346/74 MP |
| 2,738,383 | 3/1956 | Herr et al. | 179/100.2 E |
| 3,213,429 | 10/1965 | Schwertz | 178/6.6 TP R |
| 3,055,006 | 9/1962 | Dreyfoos et al. | 346/77 E |
| 3,547,628 | 12/1970 | Wolff | 346/74 TP |

*Primary Examiner*—Vincent P. Canney
*Assistant Examiner*—Jay P. Lucas
*Attorney, Agent, or Firm*—Benoit Law Corporation

[57] ABSTRACT

A method of recording information provides, in a deformable magnetic recording medium, deformed portions representative of the information, and magnetizes these deformed portions differently from other portions of the magnetic recording medium so as to establish a magnetic record of the information. Apparatus and media for practicing this method are also disclosed.

40 Claims, 21 Drawing Figures

INVENTOR.
JOSEPH GAYNOR
BY
[signature]
ATTORNEY

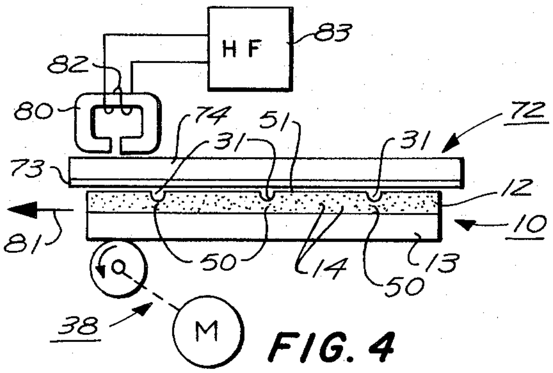
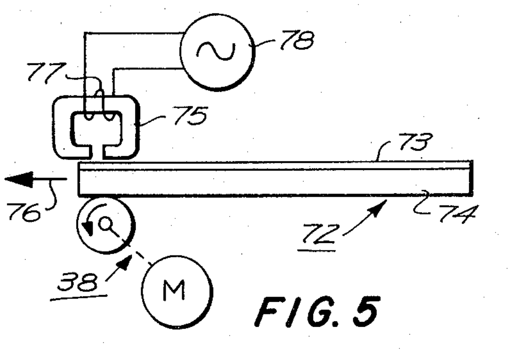
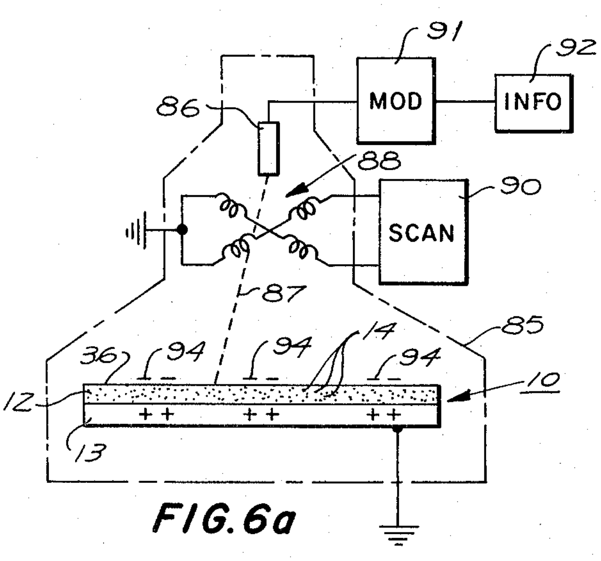
FIG.6a
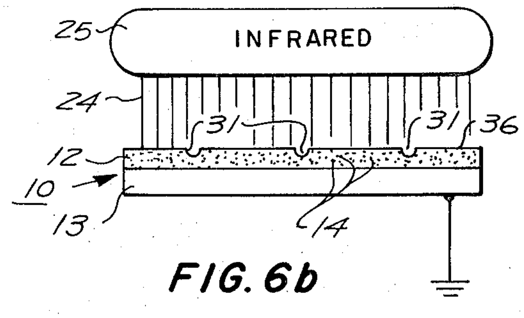
FIG.6b
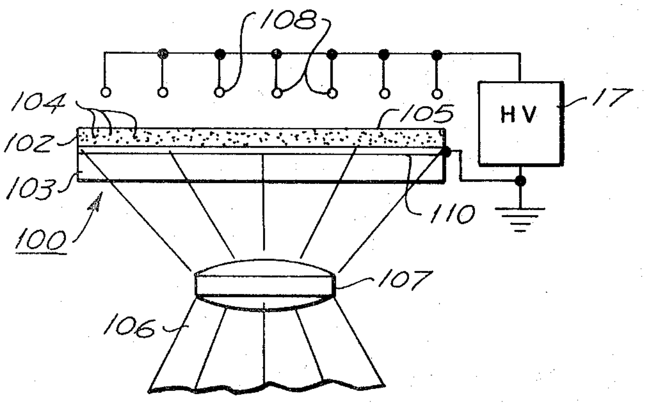
FIG.7a
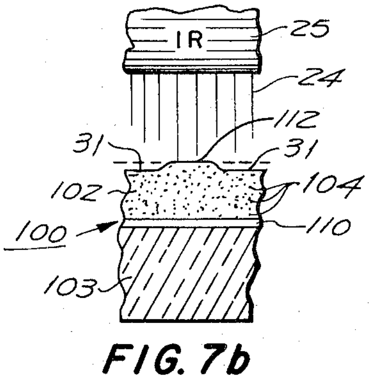
FIG.7b
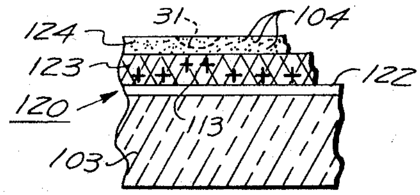
FIG.8
INVENTOR.
JOSEPH GAYNOR
BY
ATTORNEY INVENTOR.
JOSEPH GAYNOR
BY
[signature]
ATTORNEY

INFORMATION RECORDING METHODS, APPARATUS AND MEDIA USING DEFORMABLE MAGNETIZED MATERIALS

BACKGROUND OF THE INVENTION

1. Field of the Invention

The present invention relates to the art of information recording, reproduction and printout with the aid of deformable magnetic recording media.

2. Description of the Prior Art

Information recording by plastic film deformation has received considerable attention in recent years because of its promise as an imaging technique, its inherent processing simplicity and its erasure capability (see Dessauer and Clark, XEROGRAPHY, (The Focal Press, 1965) pp. 375–89, and passim[hereinafter referred to as Dessauer & Clark], and Schaffert, ELECTRO-PHOTOGRAPHY, (The Focal Press, 1965) pp. 35–37 [hereinafter referred to as Schaffert]).

Despite its many advantages, plastic deformation recording has received practically no commercial application to date; mainly because duplication and readout of the recorded information are not easily accomplished, and no efficient and reliable printout has been possible so far.

SUMMARY OF THE INVENTION

The subject invention overcomes these disadvantages and, from one aspect thereof, resides in a method of recording information, comprising in combination the steps of providing a deformable magnetic recording medium capable of retaining a magnetic moment upon magnetization thereof, applying deformation forces to said deformable magnetic recording medium and providing with said deformation forces in said magnetic recording medium deformed magnetic recording medium portions representative of the information, and magnetizing these deformed portions of said magnetic recording medium differently from other portions of the magnetic recording medium so as to establish a magnetic record of the information by subjecting said deformed portions and said other portions to an alternating magnetic field decaying as a function of distance, said alternating magnetic field being applied independently of said application of deformation forces.

It will be noted that the definition contained in the preceding paragraphs as well as the definitions recited below with respect to further aspects of the subject invention are not limited by their terms to the above mentioned prior-art film deformation techniques, and no limitation to any established method, apparatus or medium is indeed intended.

By establishing a magnetic record of the information contained in the deformed portions or deformation pattern, the subject invention provides for a record which can easily be duplicated by such means as anhysteretic duplication, which can conveniently be read out by such means as magnetic playback heads, and that, in accordance with a preferred embodiment of the subject invention, can repeatedly be printed out with the assistance of magnetically attracted toner.

The combinations of the steps and means according to the subject invention are of a synergistic nature since the latter facilities of duplication, readout and printout act in concert with the imaging capabilities, inherent process simplicity and erasure facility of deformation-recording media.

In accordance with the preferred embodiment of the subject invention, depressions representative of the information and located above portions of said magnetic recording medium are provided in the deformable magnetic recording medium, and a magnetic record of the information is established by magnetizing regions (e.g., raised portions) of the magnetic recording medium between the depressions stronger than portions of the magnetic recording medium below the depressions, said magnetic record being established independently of said application of deformation forces.

By way of example, a magnetic record established by this preferred method permits the production of records, such as transparencies or opacities, of optical images with the assistance of magnetically attracted toner.

A method in accordance with another preferred embodiment of the subject invention comprises in combination the steps of providing a deformable, electrically chargeable and photoconductive magnetic recording medium, exposing this magnetic recording medium to electric charges and to an image to be recorded to provide on the magnetic recording medium a pattern of electric charges corresponding to the image, enabling the electric charges to deform portions of the magnetic recording medium corresponding in distribution to the pattern of electric charges, and magnetizing the deformed portions differently from other portions of the magnetic recording medium so as to establish a magnetic record of the image.

The photoconductive nature of the magnetic recording medium has the advantage of permitting the recording of luminous and other images to which photoconductors are or can be made responsive. In accordance with preferred embodiments of the currently discussed aspects of the subject invention, the photoconductive magnetic recording medium can be provided by dispersing ferromagnetic particles in a thermoplastic photoconductor, or by dispersing ferromagnetic particles in a stratum of a thermoplastic photoconductive sheet, or by dispersing ferromagnetic particles in a thermoplastic sheet and combining a sheet-like photoconductor with this thermoplastic sheet.

The subject invention also provides apparatus and media which will be disclosed as this description proceeds.

BRIEF DESCRIPTION OF THE DRAWINGS

The invention will become more readily apparent from the following detailed description of preferred embodiments thereof, illustrated by way of example in the accompanying drawings, in which:

FIG. 4 is a diagrammatic representation of a preferred magnetization process to which the deformed recording medium is subjected;

FIG. 5 is a diagrammatic representation of a preferred method and means for carrying out the magnetization process of FIG. 4;

FIGS. 6a and 6b are diagrammatic representations of phases of an information recording method in accordance with a further preferred embodiment of the subject invention and of means for carrying out such information recording method;

FIGS. 7a and 7b are diagrammatic representations of phases of an imaging method in accordance with yet another preferred embodiment of the subject invention and of means for carrying out such imaging method;

FIG. 8 is a section through an imaging medium in accordance with a further preferred embodiment of the subject invention;

Figure 1A:
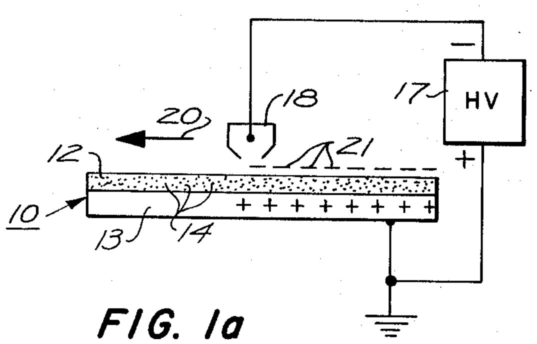
FIGS. 1*a* through 1*e* constitute a flow sheet of a recording process in accordance with a first preferred embodiment of the subject invention and also disclose means for carrying out such recording process.

In all the accompanying drawings, like reference numerals among the various figures designate like or functionally equivalent parts. To avoid cumbersome repetition, a part which appears in two or more figures of the drawings is typically described hereinafter with reference to one of these figures. The description of that one figure should then be consulted for a fuller understanding of the nature and function of that part in all the figures in which it appears.

DESCRIPTION OF PREFERRED EMBODIMENTS

The deformable magnetic recording medium 10 illustrated in FIG. 1a comprises a layer 12 of thermoplastic material disposed on an electrically conductive substrate 13, and particles 14 of ferromagnetic material dispersed throughout the layer 12.

A large and expanding body of literature exists on plastic-deformation information recording, and constitutes a copious source of data and know-how on the composition and constitution of suitable thermoplastic material layers 12. By way of example and not by way of limitation, suitable materials for the layer 12 include acetals, acrylics, polyesters, silicones, and vinyl resins having a substantially infinite room temperature viscosity and a substantially fluid viscosity temperature of 100° to 150° C, together with a high electrical resistivity permitting an at least temporary retention of electric charges by the layer 12. Preferred resistivities for the layer 12 are about $10^{15}$ ohm-cm and higher.

Mixtures of thermoplastic organic polymers may be employed for the layer 12, and a satisfactory mixture for this purpose includes, by way of example and not by way of limitation, a blend of polystyrene, *m*-terphenyl, and the copolymer of 95 wt. percent of butadiene with 5 wt. percent of styrene, in the ratios of 70 percent polystyrene, 28 percent *m*-terphenyl, and 2 percent of the copolymer.

Information on these and further materials for the deformable layer 12 may for instance be obtained from U. S. Pat. No. 3,291,601, Process of Information Storage on Deformable Photoconductive Medium, by myself, issued Dec. 13, 1966, U. S. Pat. No. 3,400,382, Thermoplastic Recording Medium, by F. Kurzweil, Jr., issued Sept. 3, 1968, or U. S. Pat. 3,413,146, Thermoplastic Recording Medium, by H.R. Anderson and P. Levine, issued Nov. 26, 1968.

The thermoplastic material in the form of the layer 12 is deposited on the electrically conductive substrate 13 which, by way of example, may be a foil of a metal, such as aluminum, chromium or nickel, or a foil of a plastic material (e.g., a film base material of the type sold by E.I. du Pont de Nemours & Company under their registered trademarks "Mylar" and "Cronar") having a film of a metal or electrically conductive metal compound, such as aluminum, tin, chromium, nickel, stannic oxide, or cuprous oxide deposited thereon (see the above mentioned U. S. Pat. No. 3,291,601).

The thickness of the deformable layer is more a matter of good practice than of critical limitation. As a broad guide, it is good practice to make the layer 12 at least as thick as the desired minimum distance between information-representative deformations to be recorded, and several times as thick as the mean size of the magnetic particles 14.

Suitable materials for the particles 14 in the layer 12 include nickel, cobalt, or hard iron, or compounds such as gamma ferric oxide or magnetite ($Fe_3O_4$), as well as ferromagnetic iron, nickel or cobalt alloys, or any material that substantially retains a magnetic moment upon magnetization thereof.

The particles 14 are typically intermixed with the material of the layer 12 before the same is applied to the substrate 13.

The concentration of the particles 14 in the layer 12 is low enough to preclude electrical contact between the particles which, if present, would interfere with an electric charge deposition or retention on the layer 12. If the particles 14 are electrically conducting on their surface, they may be coated with an electrically insulating material prior to their incorporation in the layer 12.

The electrically conductive substrate 13 is in FIG. 1a connected to a grounded terminal of a source 17 of high-voltage electric energy. An electrostatic corona charger 18 is connected to the other terminal of the high-voltage source 17.

The corona charger 18 is moved relative to the recording medium 10 as indicated by the arrow 20, so that charges 21 are deposited on the recording medium 10. In the embodiment shown in FIGS. 1a to 1e, no information modulation is imposed on the charge deposition. It can thus be said that the charge deposition according to FIG. 1a is uniform, with the understanding that the term "uniform" is intended to be broad enough to cover also discontinuous charge patterns, such as line patterns, as long as these are not information-modulated. Also, while negative charges have been shown at 21 and corresponding positive charges at the electrode 13, these polarities may be reversed if desired.

Upon electrostatic charging the recording medium 10 is exposed to a thermal image 23 of the information to be recorded. According to the preferred embodiment illustrated in FIG. 1b, this is accomplished by directing infrared radiations 24 from a source of infrared radiations 25 against a master record 26 which has infrared-opaque regions 28 and infrared transparent portions 29 arranged as to represent the information to be recorded.

By way of example, the master record 26 may include a transparent silver-halide photograph of an object. Other suitable master records include any opaque heat-resistant foil or sheet having cut-out portions 29, or any transparent heat-resistant foil or sheet having opaque portions 28 printed, painted or otherwise deposited thereon.

Figure 1B:
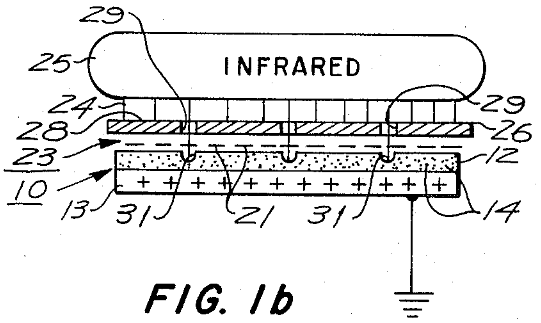
Figure 1C:
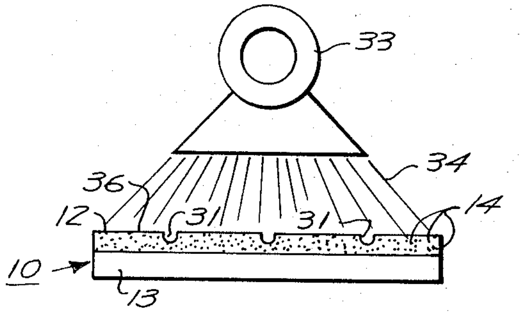

Infrared radiations penetrating the transparent record areas 29 and impinging on the magnetic recording medium 10 soften portions of the layer 12 sufficiently to permit electrostatic charges 21 to provide deformed portions 31 which are representative of the information to be recorded. In the illustrated preferred embodiment the deformed portions 31 constitute depressions in the layer 12. The deformation process shown in FIG. 1*b* is followed by a cooling step in which the depressions 31 are fixed in the layer 12. To this end FIG. 1*c* shows a fan structure 33 which directs a stream 34 of cold air to the top surface 35 of the medium 10. It should be understood in this connection that the cooling step for fixing the depressions 31 need not necessarily be brought about by the application of a coolant or by another deliberate removal of thermal energy from the layer 12. In many instances heat losses by the layer 12 to the environment will be sufficient to bring about the requisite cooling step.

The depressions 31 having been fixed in their environment, a magnetic record of the information is established in the medium 10. According to the preferred embodiment illustrated in FIG. 1*d*, this is accomplished by moving the medium 10 by means of a drive 38 relative to a magnetic recording head 40 as indicated by an arrow 41.

The magnetic recording head 40 has a core 42 defining an air gap 43 and having a winding 44. An oscillator 46, which may be of a conventional type, provides high-frequency oscillations which drive the winding 44 upon amplification at 47. In consequence, a high-frequency magnetic field 48 emanates from the air gap 43.

Those skilled in the art of magnetic tape recording will recall at this juncture that the intensity of magnetic recordings decreases as a function of the depth of the magnetic recording medium or, more generally, as a function of distance from the air gap. The effect of this phenomenon increases in proportion to the frequency of the recorded signal.

Figure 1D:
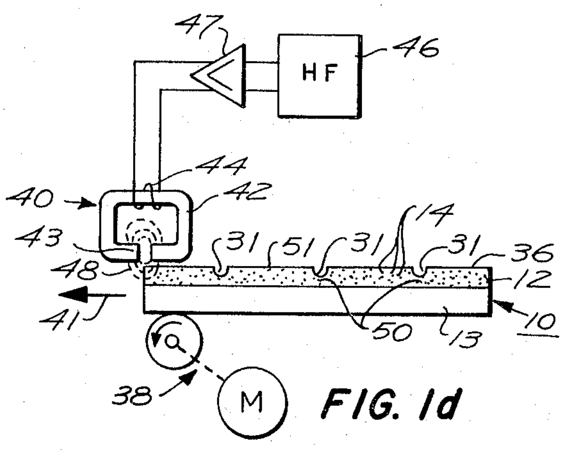

The preferred embodiment of FIG. 1*d* utilizes this effect by energizing the magnetic head 40 with a high-frequency oscillation so that the magnetization produced in the layer 12 by the rapidly alternating magnetic field 48 drops off or decays with increasing distance from the top surface 36. It is well known in the art of magnetic tape recording that the intensity of recordings of high-frequency signals drops off by as much as the fourth power of distance from the top surface of the recording medium. This drop-off can be alleviated by such means as the use of copper inserts in the air gap which drive the magnetic fringing field away from the gap. Compensating means of this nature are omitted in the preferred embodiment of the subject invention so as to preserve a rapid drop-off of the magnetic field.

Since the portions 50 of the magnetic recording medium below the depressions 31 are spaced farther from the magnetic recording head than the regions 51 between the depressions, it follows as a consequence of the principle just discussed that the non-depressed regions 51 of the magnetic recording medium, which in practice may include raised portions adjacent the depressions 31, are stronger magnetized than the portions 50 below the depressions 31. As a result, a magnetic record 53 is established in which regions which have not been exposed to infrared radiations are strongly magnetized as indicated at 54 in FIG. 1*e*, while the magnetization in the depressions 31, which represent portions that have been exposed to infrared radiations, is weak.

The magnetic record 53 can easily be duplicated, read out, and printed out. Duplication of the magnetic record 53 may for instance proceed by means of the well-known anhysteretic copying process in which a magnetic recording medium having a coercivity lower than that of the particles 14 is held against the layer 12, whereupon a high-frequency magnetic field is moved along these contacting media so that magnetic particles of the copy medium are successively subjected to anhysteretically decaying magnetic fields of a peak value higher than the coercivity of the copy medium but lower than the coercivity of the particles 14. An illustrative example of such a duplication process is shown in, and described in connection with, FIG. 12.

Figure 1E:
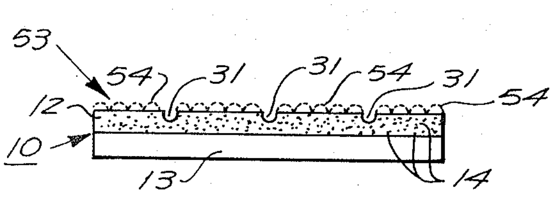
Figure 2:
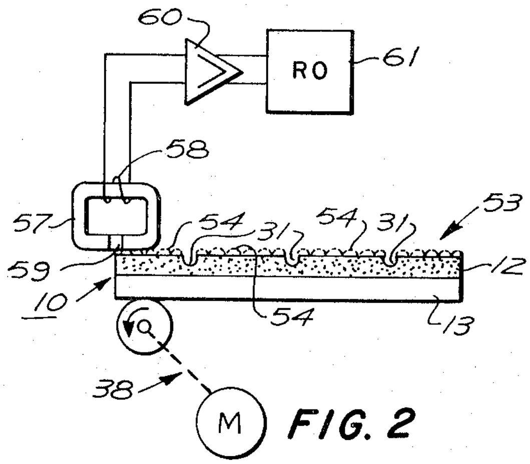
FIG. 2 is a diagrammatic illustration of a possible readout of magnetically recorded information.

Reverting to the magnetic record 53 shown in FIG. 1*e*, equipment for reading out that magnetic record is shown in FIG. 2.

The readout equipment of FIG. 2 includes a magnetic playback head 57 which is moved relative to the medium 10 by a drive 38, and which has a winding 58 in which electrical signals are induced by the magnetic record 53. These electric signals correspond to magnetic gradients of the record 53 encountered by an air gap 59. These induced signals are amplified at 60 and fed into a readout system which may include display, storage or any other kind of equipment, depending on the contemplated use of the readout information.

Figure 3A:
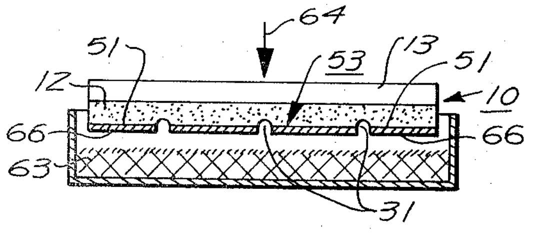
FIGS. 3*a* and 3*b* are diagrammatic representations of a printout process and printout means in accordance with a further preferred embodiment of the subject invention.
Figure 3B:
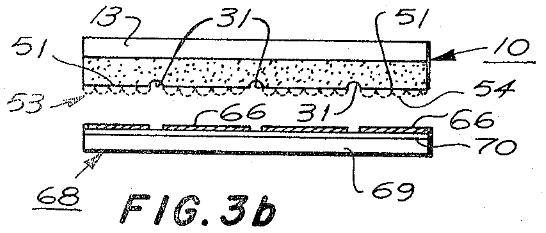

FIG. 3*a* and 3*b* jointly illustrate a method and means for printing out the information record 53.

According to FIG. 3*a* the medium 10 is moved relative to a supply of magnetic toner 63 as indicated by the arrow 64. Magnetic toner is well-known in the art of magnetic printing and may include particles of iron, nickel, cobalt or ferromagnetic compositions thereof. These ferromagnetic particles can be used as a magnetic toner for printout on a tacky surface. If printing out on a dry surface is desired, the ferromagnetic particles are preferably suspended in a toning liquid or provided with shells of fusible material.

The subject invention may, if desired, be practiced with conventional liquid or dry magnetic toners. Suitable magnetic toners are, for instance, disclosed in U. S. Pat. No. 2,932,278, by J.C. Sims, issued Apr. 12, 1960, U. S. Pat. No. 2,943,908, by J.P. Hanna, issued July 5, 1960, and U. S. Pat. No. 3,250,636, by R.A. Wilferth, issued May 10, 1966.

Toner particles from the supply 63 are attracted by and tone the magnetic record 53 to provide a toner image 66 that is complementary to the image presented by the depressions 31. Since the magnetization in the depressions 31 is much weaker than the magnetization in the regions 51, toning of the depressions 31 during toning of the regions 51 is avoided. If desired or necessary, the medium 10 may be vibrated after toning in the upside-down position shown in FIG. 3*a* to assure a shaking of non-adhering particles out of the depressions 31, or the toned medium may be placed into proximity of a magnet (not shown) which will remove non-adhering particles from the depressions 31, while not being strong enough to pull adhering particles from the magnetized portions of the medium.

According to FIG. 3*b* the toner image 66 is printed on a printout medium 68 that may for instance be composed of a sheet of paper 69 that has a tacky surface 70 to which the toner image 66 adheres when the medium 10 is brought into close proximity to the printout medium 68, and by means of which the toner image 66 is pulled off the medium 10 when the printout medium is moved away from the magnetic record.

Since the magnetic record 53 remains on the recording medium 10 and is physically persistent, repeated toning and printout of the magnetic record is possible.

The alternative to the magnetization process illustrated in FIG. 1*d* is shown in FIGS. 4 and 5.

According to FIG. 5, a conventional magnetic recording medium 72 has a recording layer 73 provided on a substrate 74. The recording layer 73 has particles of a magnetic recording medium, such as an iron oxide (e.g., gamma ferric oxide), or ferromagnetic chromium dioxide dispersed in a binder matrix. A drive 38 moves the magnetic recording medium 72 relative to a conventional magnetic recording head 75 as indicated by an arrow 76. The magnetic recording head 75 has a winding 77 energized by a source 78 of alternating current so that a line pattern of magnetic gradients is recorded on the medium 72.

According to FIG. 4 the recording medium 72 with the line pattern just mentioned recorded thereupon is brought into contact with the medium 10 having the depressions 31. These two media are thereupon moved by the drive 38 relative to a magnetic recording head 80, as indicated by an arrow 81. The magnetic head 80 has a winding 82 energized from a source 83 of high-frequency current, for the performance of an anhysteretic copying process of the type described, for instance, in U. S. Pat. No. 2,738,383, by R. Herr et al, issued Mar. 13, 1956.

To this end, the medium 72 may have a higher coercivity than the particles 14 in the medium 10 and the magnetic recording head 80 imposes an alternating magnetic field which travels along the media 10 and 72 and which has a peak intensity higher than the coercivity of the particles 14 but lower than the coercivity of the medium 72.

In this manner the magnetic line pattern on the medium 72 is copied on the medium 10. This copying effect is much stronger in the portions 51 which are in close proximity to the medium 72 than in the portions 50 which are spaced from the medium 72 by the depth of the depressions 31.

The result of this magnetization operation is again a magnetic record 53 in which strong magnetizations 54 stand in contrast to weak or negligible magnetization in the depressions 31.

If the presence of depressions 31 causes problems during the toning process, or during other stages of the handling of the recording medium 10, the recording medium with the magnetic record 53 may be exposed to the infrared source 25 of FIG. 1*b* so that the layer 12 is sufficiently softened by heat to permit surface tension to smoothen out the depressions 31.

The embodiment illustrated in FIG. 6*a* and 6*b* provides the information-indicative depressions 31 with the aid of an electric charge pattern that is representative of the information to be recorded. In other words, while the information input in the embodiment of FIGS. 1*a* to 1*e* was contained in a pattern of thermal gradients, it is now contained in a pattern of electric charges.

To this end, the deformable magnetic recording medium 10 is located in an evacuated enclosure 85 which houses a conventional electron gun 86 for producing a beam of electrons 87 and a deflection system 88 for deflecting the beam 87.

The deflection system 88 is driven by a conventional scanner 90 which causes the electron beam 87 to scan the surface 36 of the deformable layer 12. The electron gun is driven by a conventional beam intensity control 91 which modulates the intensity of the electron beam 87 in response to the information to be recorded, as indicated by the block diagram 92. The result is a pattern 94 of electric charges which represents the information on the recording medium 10. An intensity-modulated electron beam system and a thermoplastic tape recorder readily adaptable to present purposes is described and illustrated in Glenn, Thermoplastic Recording, 30 J. Appl. Phys., No. 12, (Dec. 1959) pp. 1,870–73.

According to FIG. 6*b* the medium 10, having been provided with an electrostatic charge pattern as shown in FIG. 6*a* is exposed to infrared radiations 24 from an infrared source 25 so that the deformable layer 12 is softened. The electrostatic charges in the pattern 94 shown in FIG. 6*a* thereupon act upon portions of the softened layer 12 and provide the depressions 31.

The medium 10 shown in FIG. 6*b* may thereupon be cooled as shown in FIG. 1*c* and magnetized as illustrated in FIG. 1*d* or FIG. 4, whereupon the magnetic record shown in FIG. 1*e* is realized and may be utilized as described above. While the same materials may be employed in the medium 1*o* for the embodiments of FIGS. 1*a* through 6*b*, information for materials and techniques peculiar to electron beam recording may for instance be derived from Chang, The Physical Parameters of a Thermoplastic Polymer Film in an Electron Beam Read/White System, 12 Phot. Sc. and Engr., No. 5 (Sept.–Oct. 1968), pp. 238–43.

The embodiment illustrated in FIGS. 7*a* and 7*b* employs a special deformable magnetic recording medium 100 in accordance with a further preferred embodiment of the subject invention. The recording medium 100 includes a layer 102 of thermoplastic photoconductive material located on a transparent glass or organic substrate 103 and having ferrromagnetic particles 104 incorporated therein. The ferromagnetic particles 104 may be of the same type as the above mentioned ferromagnetic particles 14, and electrical contact between these particles is again avoided as mentioned above in connection with the particles 14.

The thermoplastic photoconductive material in the layer 102 may, for instance, be of the type disclosed in the above mentioned U. S. Pat. No. 3,291,601, filed by myself. The thermoplastic photoconductive material for the layer 102 may be prepared by synthesis of photoconductive, thermoplastic polymers and by solution or dispersion of organic or inorganic photoconductors in thermoplastic matrices, as described in Gaynor and Aftergut, Photoplastic Recording, 7 Phot. Sc. and Engr., No. 4 (July–August 1963), pp. 209–13. Further thermoplastic photoconductive materials are described in Aftergut, Bartfai and Wagner, Photoplastic Recording Film Made with CdS. J. Applied Optics, Suppl. No. 3, Electrophotography (1969), and Bartfai, Ozarow and Gaynor, Red-Sensitive Photoplastic Recording, 10 Phot. Sc. and Engr., No. 1 (Jan.–Feb. 1966).

Electrostatic charges are applied to the layer 102 by a system of charging wires 108 which is connected to one terminal of a source 17 of high-voltage electric energy. The other terminal of the source 17 is grounded and connected to a conventional transparent electrode 110 deposited on the substrate 103 and sandwiched between this substrate and the layer 102 as shown in FIG. 7*a*. Alternatively, the corona charger 18 of FIG. 1*a* may be used for electrostatically charging the layer 102.

Suitable materials for the transparent electrode 110 include, for example, the metals iron, chromium, nickel and tin; metallic oxides, such as stannic oxide and indium oxide; and metallic salts, such as copper sulfide and copper iodide.

After the photoconductive layer 102 has been charged, it is exposed to a luminous image 106 with the aid of a lens system 107. The photoconductor layer 102 becomes electrically conductive where it is hit by light. In consequence, charges can recombine at these locations to leave a charge pattern where no light hit the photoconductor layer 102.

As shown in FIG. 7*b*, the medium 100 is thereupon exposed to uniformly distributed infrared radiations 24 provided by the infrared source 25. As before, the information-representative pattern of charges provides a corresponding pattern of depressions 31. Where charges have been recombined by action of the photoconductor layer 102, a peak 112 remains. Upon magnetization of the layer 102 in the manner shown in FIG. 1*d* or FIG. 4, for instance, the peaks 112 are magnetized stronger than the valleys 31 so that a negative image of the luminous input 106 is obtained upon printout with dark magnetic toner.

According to the embodiment of FIG. 8 a transparent substrate 103 of the above mentioned type carries a conventional transparent electrode 122 which corresponds to the electrode 110 in FIG. 7*a*. A sheet-like photoconductor 123 is deposited on the electrode 122. A sheet 124 of thermoplastic material is deposited on the photoconductor 123 and has the previously described ferromagnetic particles 104 dispersed therein.

Suitable examples of preferred materials for the sheetlike photoconductor 123 include cadmium sulfide, cadmium selenide, a photoconductive selenium tellurium alloy, sensitized zinc oxide or lead sulfide, dispersed in a binder of an electrically insulating material in a manner known per se.

The thermoplastic sheet 124 may be of the same material as the above mentioned sheet 12.

The medium 120 may be employed in the embodiment of FIGS. 7*a* and 7*b* in lieu of the medium 100 and is electrically charged by the corona charger 18 or charging wire arrangement 108. Where the photoconductor layer 123 is hit by light during its exposure to the input image 106, electric charges can flow from the electrode 122 to the lower surface of the thermoplastic sheet 104 as shown at 113. In consequence of the increased field strength, depressions 31 will occur at the location of the charges 113 when the layer 124 is exposed to the infrared radiations 24. If desired, the information-representative charges 113 may be intensified prior to heating of the thermoplastic layer. To this end, the medium 120 is again exposed to the action of the charging wire arrangement 108 or corona discharger 18, whereby the charge densities at the previously light-exposed areas are increased.

Information-representative depressions 31 having been formed, the layer 124 is magnetized in the manner shown in FIG. 1*d* or FIG. 4, for instance. As before, the resulting magnetic information record can be read out, duplicated, or printed out as described above. If the magnetic record is printed out with a dark magnetic toner, a positive print of the input image is obtained.

Figure 9:
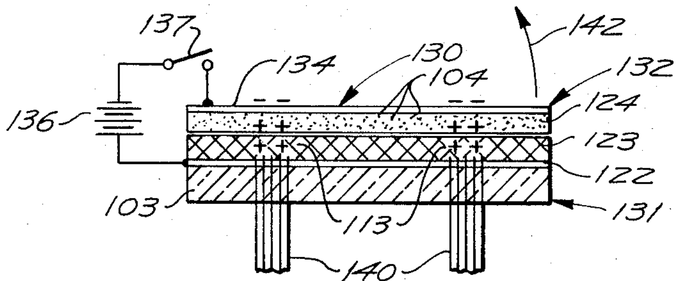
FIG. 9 is a section through a composite imaging medium in accordance with yet another embodiment of the subject invention.

A further photosensitive embodiment is shown in FIG. 9. The composite magnetic recording medium 130 of FIG. 9 is composed of two mutually separable parts 131 and 132. The part 131 comprises the transparent substrate 103, transparent electrode 122 and sheet-like photoconductor 123 described above in connection with FIG. 8. The part 132, on the other hand, comprises the previously described sheet 124 of thermoplastic material and an electrode 134. The sheet 124 is deposited on the electrode 134 and includes the magnetizable particles 104. The electrode 134 may be of the same material as the previously described electrode 13.

The electrode 122 is connected to one terminal of a source 136 of electric current, while a switch 137 upon closure connects the electrode 134 to the other terminal of the source 136. In operation the parts 131 and 132 are positioned as shown in FIG. 9 and are pressed in mutual contact by such conventional means as spring clips, mounting members and the like (not shown). An intimate contact between the photoconductor sheet 123 and the thermoplastic sheet 124 is important for optimum charge transfer. In practice slight gaps between the sheets 123 and 124 are not always avoidable, and it may then be advisable or necessary to provide the source 136 with a high voltage of sufficient magnitude to assure a voltage breakdown for the desired charge transfer.

To initiate operation of the composite recording medium 130, the switch 137 is closed and the photoconductor sheet 123 is exposed to an input image. Where light stimuli 140 impinge upon the photoconductor, electric charges 113 flow toward the sheet 124 and transfer themselves onto the electrically insulating sheet 124. In this manner, an electric charge pattern corresponding to, or being representative of, the input information is provided on the deformable magnetic recording sheet 124.

The charged sheet 124 is then separated from the photoconductor assembly, as symbolically illustrated by the arrow 142. The sheet 124 may now be softened for a provision of information-representative depressions by such means as an exposure to imfrared radiations according to FIG. 6*b*. A magnetic record of the type shown at 53 in FIG. 1*e* may then be established in the manner illustrated in FIG. 1*d* or FIG. 4.

A substantial advantage of the embodiment shown in FIG. 9 resides in the fact that the magnetic recording medium is separable from the photoconductor medium. In practice it will be found that the expense of the magnetic medium part 132 is typically several times lower than the expense of the photoconductor assembly part 131. If the part 132 is separable from the part 131, then significant overall savings can be realized by making the part 132 disposable.

Also, since the part 132 can be removed from the part 131, the thermoplastic sheet 124 can readily be subjected to any desired thermal treatment without fear of an adverse effect on the photoconductor sheet 123.

Another advantageous embodiment of the subject invention is obtained through the utilization of a deformable photovoltaic thermoplastic medium of the type described, for instance, in Gaynor and Sewell, Photocharge Process, 11 Phot. Sc. and Engr., No. 3 (May–June 1967) FIG. 10 illustrates this embodiment.

Figure 10:
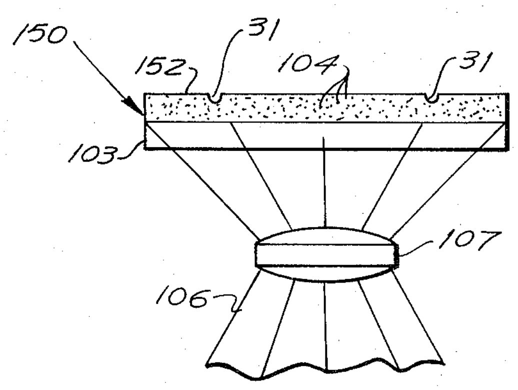
FIG. 10 is a diagrammatic representation of an imaging method in accordance with a further preferred embodiment of the subject invention and of means for carrying out such information recording method.

The deformable magnetic recording medium 150 of FIG. 10 has a layer 152 of magnetizable photovoltaic thermoplastic material deposited on the previously described transparent substrate 103. The layer 152 includes the above mentioned magnetizable particles 104, as well as a photovoltaic compound dissolved in a thermoplastic polymer. A preferred polymer is polystyrene having a molecular weight of about 20,000 and a melting point of 100° C. Other polymers or polymer blends having similar dielectric properties and melting temperatures and melt viscosities are also suitable.

The photovoltaic compound is preferably a polyhalogenated aliphatic hydrocarbon, such as iodoform, carbon tetrabromide, methylene iodide, or tetraiodoethylene. Aromatic amines, such as diphenylamine, triphenylamine or *p*-phenyl-azoaniline, enhance both the sensitivity and spectral response.

The polymer and photovoltaic material are codissolved in an aromatic solvent; the ratio being about twenty to one by weight. Concentration of sensitizer is usually an order of magnitude lower than that of the photovoltaic material.

To record an image, the film is preferably heated in the dark to recombine stray charges that may have accumulated. An input image 106 may then be projected through the transparent substrate 103 and onto the layer 152 by means of the lens 107. While the precise mechanism of imaging is not yet fully understood, it is believed that an image exposure leads to a photochemical reaction in the layer 152 which gives rise to the generation of charged species; a cation and an electron, or an anion and a hole, distributed so as to be representative of the input image.

The layer 152 may then quickly be heated in the manner illustrated in FIG. 6*b* to provide the image or information representative depressions 31. The layer 152 is then magnetized in the manner illustrated in FIG. 1*d* or FIG. 4 to provide a magnetic record of the image.

Figure 11:
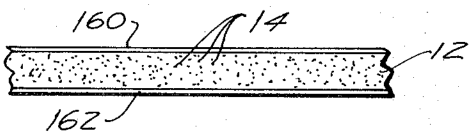
FIG. 11 is a cross-section through a deformable magnetic recording medium in accordance with a further preferred embodiment of the subject invention.

FIG. 11 illustrates a method for increasing the electrical chargeability of the deformable magnetic recording media so far described. According to FIG. 11, the above-mentioned medium 12, for instance, with included magnetizable particles 14, is provided with a first coating 160 of thermoplastic material and a second coating 162 of thermoplastic material. The coatings 160 and 162, between which the magnetic particles 14 are located, are preferably made of the same thermoplastic material as the layer 12, without any magnetic particles being, however, included in the coatings 160 and 162.

The medium illustrated in FIG. 11 may, for example, be provided by applying the thermoplastic coating 162 to the above mentioned substrate 13. After cooling of the layer 162, the thermoplastic layer 12 with included magnetizable particles 14 is deposited on the layer 162. After cooling of the layer 12, the thermoplastic coating 160 is applied thereto to complete the desired deformable recording medium.

A major feature of the embodiments of the subject invention is the facility with which multiple prints are effected from a recorded image or other recorded information. Unlike electric charges, the magnetic record 53 does not decay with time, so that it is theoretically possible to produce an unlimited number of prints by magnetic toner printout techniques. A practical limit is, however, frequently imposed by wear and tear of the deformable magnetic recording medium in multiple printout operations. Where this drawback is found to exist, problems are easily avoided by means of the method and equipment illustrated in FIG. 12.

Figure 12:
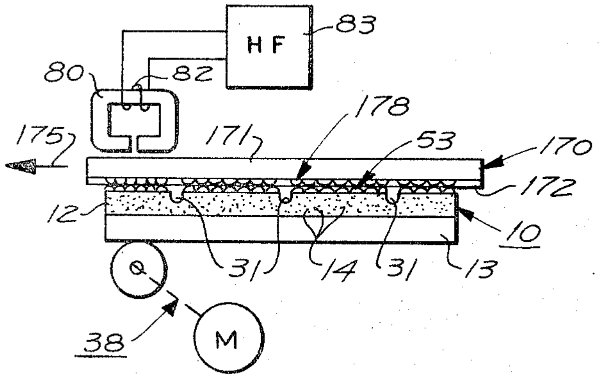

According to FIG. 12, the above mentioned drive 38 and anhysteretic magnetizing equipment 80, 82 and 83 are employed to copy the magnetic record 53 of the input image or information on a magnetic copy medium 170 by using, for example, the magnetic copying technique disclosed in the above mentioned U. S. Pat. No. 2,738,383, by R. Herr et al, the disclosure of which is herewith incorporated by reference herein.

The copy medium 170 has a conventional substrate 171 which bears a layer 172 including a magnetic recording material, such as gamma ferric oxide. To assure a copying of the magnetic record on the medium 170 without an erasure thereof on the medium 10, the coercivity of the magnetic recording material in the layer 172 preferably has a lower coercivity than the magnetic particles 14 in the layer 12.

The magnetic record 52, which may be called a magnetic master record, may be produced by any of the methods and apparatus above described, and it should be noted in this connection that the use in FIG. 12 of the recording medium and magnetic record as illustrated in FIG. 1*e* is in no sense intended to preclude an application of the process and equipment of FIG. 12 to any of the other embodiments of the subject invention.

The medium 170 is placed adjacent to the medium 10, with the layer 172 preferably contacting the layer 12 (or the coating 160 of FIG. 11, if used). The drive 38 jointly advances the media 10 and 170 in the direction of arrow 175 past the magnetic recording head. The recording head 80 is as before energized by the high-frequency source 83 to provide the requisite anhysteretic transfer field at the layer 172 for a copying of the magnetic record 53 in the layer 172.

In this manner, a magnetic record 178 which is a copy of the magnetic master record 53 is provided on the copy medium 170. This copy record may then be employed for multiple readout and printout purposes. In this respect the media 10 and 170 jointly yield a result that by far exceeds the result that would be obtained by an implementation of the requisite properties in the layer 12 alone.

More specifically, if the magnetic record 52 is desired to be read out or printed out from the deformable magnetic recording medium itself, there typically exists a practical limit on the number of attainable readout or printout operations, since adequate thermal deformability and substantial mechanical surface wear resistance generally are mutually countervailing properties. A delegation of the multiple printout or readout of the magnetic record to the copy medium 170 frees the choice of the deformable medium 12 from overriding wear and tear considerations, so that an optimum material in terms of deformability, electrical properties and, if desired, reusability can be chosen. As a corollary, the selection of the material for the layer 172 on the copy medium is freed from considerations of deformability and electrical suitability, and a material of optimum wear and tear resistance and optimum thermal stability can be selected. By way of example, the layer 172 of the copy medium 170 may include magnetizable particles incorporated in a polyurethane binder, in a polyimide binder, or in a Teflon (polytetrafluoroethylene) matrix.

By way of further modification, it should be understood that while an exposure to infrared radiations 24 has been disclosed above for the purpose of forming depressions 31 after provision of an electrostatic charge pattern, such a heating of the charged thermoplastic layer is not indispensable. Rather, a thermoplastic material may for instance be employed in the layer 12, 102 or 124 that deforms itself spontaneously upon provision of the electrostatic charge pattern. Thermoplastic materials of this type are, for instance, disclosed in U.S. Pat. No. 3,441,939, Thermoplastic Recording Technique, by H.R. Anderson, issued Apr. 29, 1969.

Special techniques for improving the image quality may advantageously be employed in the methods and apparatus of the subject invention to improve the quality of the magnetic record as well as of printed-out images. For instance continuous-tone response may, in a manner known per se, be obtained by screening or by frosting of the image. Useful teachings on image screening as well as frosting are contained in Urbach, The Role of Screening in Thermoplastic Xerography, 10 Phot. Sci. and Engr., No. 5, (September–October 1966), pp. 287–97. Specific information on image frosting techniques and equipment is, for instance, apparent from Gundlach and Claus, A Cyclic Xerographic Method Based on Frost Deformation, 7 Phot. Sci. and Engr., No. 1, (Jan.–Feb. 1963), pp. 14 – 19; Sullivan and Kneiser, Tone Reproduction by Frost Images, 8 Phot. Sci. and Engr., No. 4, (July–Aug. 1964), pp. 206 – 11; and Bickmore and Claus, Charge Transfer Frost Xerography, 9 Phot. Sci. and Engr., No. 5, (Sept.–Oct. 1965), pp. 283 – 93.

Figure 13:
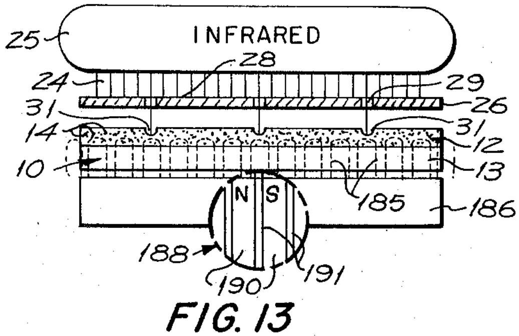

The preferred embodiment of FIG. 13 employs magnetic forces during the image-wise thermal exposure for the formation of information-representative depressions 31.

According to FIG. 13 the particles 14 in the recording medium are subjected during the thermal exposure to magnetic fields 185 which may be provided by a magnetizing structure 186. The magnetizing structure 186 may be of a permanent magnet or of an electromagnetic type. As shown in the magnified insert 188, the illustrated magnetizing structure 186 is composed of alternatively poled permanent magnet elements 190 which are mutually separated by non-magnetic spacers 191 to provide for the magnetic fields 185.

When information-representative portions of the matrix 12 are fluidized by the information-wise thermal exposure step, the magnetic fields 185 cause particles 14 in those fluidized regions to agglomerate, thereby providing the depressions 31 in the recording medium. This step as such is similar to the thermoplastic recording method shown in FIGS. 3 and 4 in U. S. Pat. No. 3,262,122, Thermoplastic Memory, by H. Fleisher et al, issued July 19, 1966, and herewith incorporated by reference herein.

Information-representative deformations or depressions 31 having been established in the manner shown in FIG. 13, or in the manner shown by the quoted Fleisher et al patent in their FIG. 3, the recording medium 10 may be magnetized according to the subject invention, such as in the manner shown in FIG. 1*a* or in FIG. 4. The result is a magnetic record that may, for instance, be read-out as shown in FIG. 2, printed-out as shown in FIGS. 3*a* and 3*b*, or copied as shown in FIG. 12.

If desired, the magnetic record may alternatively be provided by the same structure 186 that provides the deforming magnetic fields 185. To this end, the structure is constructed so that the magnetic fields 185 exceed in intensity the coercivities of the particles 14 in the layer 12, so that these particles are magnetized by these fields. If the magnetizing structure 186 is of an electromagnetic type, it may be energized by an anhysteretically alternating electric current which has an increasing amplitude that attains intensities above the coercivities of the particles 14. Anhysteretic magnetization techniques of this type are well known in the art of magnetics.

Figure 14:
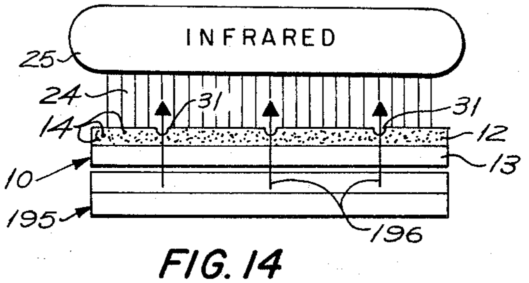
FIGS. 12, 13 and 14 are diagrammatic representations of still further methods and apparatus in accordance with preferred embodiments of the subject invention.

In the embodiment of FIG. 14 the information to be recorded is contained in the applied magnetic fields rather than in the applied thermal energy. It should, however, be understood at this juncture that information to be recorded may, if desired, be contained in both the applied magnetic field and the applied thermal energy. Such a combination of information inputs would result from a combination of the techniques illustrated in FIGS. 13 and 14.

Reverting now to FIG. 14 in particular, the information to be recorded is contained in a magnetic master record 195 having magnetic gradients 196 recorded or otherwise provided thereon. There are many well-known suitable methods for making magnetic master records. Some of these are disclosed in U.S. Pat. No. 3,120,806, Magnetic Image Plate, by E.J. Supernowicz, issued Feb. 11, 1964, and herewith incorporated by reference herein.

While recording medium 10 is exposed to the information-representative magnetic gradients 196, the layer 12 is substantially uniformly heated by the infrared radiations 24. At layer portions where the magnetic gradients prevail, particles 14 are agglomerated so that the information-representative depressions 31 appear. The resulting information record may then be magnetized in a manner shown in FIG. 1*d* or in FIG. 4 for instance. If the gradients 196 have the effect of magnetizing particles 14 in a manner that interferes with the establishment, readout or printout of the magnetic record, the particles 14 may be degaussed in a conventional manner, such as by declining anhysteretically alternating magnetic fields, before the magnetization process according to FIG. 1*d* or FIG. 4.

The information recording process of FIG. 14 may form part of a method for changing a magnetic record into its magnetic complement. While this has utility in a multitude of situations, it will for the purpose of explanation be assumed that the magnetic gradients 196 on the record 195 represent the light parts of a luminous image, while the unmagnetized portions of the record 195 represent the dark image portions.

Accordingly, if the latter magnetic record were printed out with dark magnetic toner on white paper, a negative print of the luminous image would be produced. Production of positive prints is, however, possible if depressions 31 corresponding to the magnetic gradients 196 are formed in the layer 12 in the manner disclosed above in connection with FIG. 14. If the information record resulting from this operation is subsequently magnetized, the portions of the layer 12 which correspond to the magnetized regions of the master record 195 receive a strong magnetization, while the portions of the layer 12 located below the depressions 31 and corresponding to the magnetized portions of the master record 195 receive substantially no magnetization or only a weak magnetization.

In consequence, a printout from the resulting magnetic record on the medium 10 will yield positive prints if dark toner is used on white paper in accordance with conventional practice. Since the latter magnetic record reversal aspect of the process of FIG. 14 is closely tied in with information recording processes, it is herein considered a species of information recording.

I claim:

1. A method of recording information, comprising in combination the steps of:

providing a thermoplastically deformable magnetic recording medium capable of retaining a magnetic moment upon magnetization thereof;

applying physical deformation forces to said deformable magnetic recording medium and providing with said deformation forces in said magnetic recording medium by thermoplastic deformation deformed magnetic recording medium portions representative of said information, said physical deformation forces being applied to said deformable magnetic recording medium to reduce the thickness of the magnetic recording medium at said deformed portions to values greater than zero; and magnetizing said deformed portions of said magnetic recording medium differently from other portions of said magnetic recording medium so as to establish a magnetic record of said information by subjecting said deformed portions and said other portions to an alternating magnetic field decaying as a function of distance, said alternating magnetic field being applied independently of said application of deformation forces.

2. A method as claimed in claim 1, including the step of:

printing out said magnetic record with the assistance of magnetically attracted toner.

3. A method as claimed in claim 1, wherein:

said deformable magnetic recording medium is provided by combining magnetizable particles with a photovoltaic thermoplastic medium; and said deformed portions are provided by exposing said photovoltaic thermoplastic medium having said incorporated magnetizable particles to an image of said information and softening said photovoltaic thermoplastic medium.

4. A method as claimed in claim 1, including the steps of:

providing a further magnetic recording medium; and establishing on said further magnetic recording medium a magnetic copy of said magnetic record.

5. A method as claimed in claim 4, including the step of:

printing out said magnetic copy of said magnetic record from said further magnetic recording medium with the assistance of magnetically attracted toner.

6. A method of recording information, comprising in combination the steps of:

providing a thermoplastically deformable magnetic recording medium capable of retaining a magnetic moment upon magnetization thereof;

applying physical deformation forces to said deformable magnetic recording medium and providing with said deformation forces in said magnetic recording medium by thermoplastic deformation depressions representative of said information, said physical deformation forces being applied to said deformable magnetic recording medium to reduce the thickness of the magnetic recording medium at said deformed portions to values greater than zero whereby said information-representative depressions are located above portions of said magnetic recording medium; and establishing a magnetic record of said information by magnetizing regions of said magnetic recording medium between said depressions stronger than portions of said magnetic recording medium below said depressions, said magnetic record being established independently of said application of deformation forces.

7. A method as claimed in claim 6, wherein:

said deformable magnetic recording medium is electrically chargeable; and said provision of said depressions includes the steps of establishing on said magnetic recording medium a pattern of electric charges representative of said information, and enabling said electric charges to depress selectively portions of said magnetic recording medium.

8. A method as claimed in claim 6, wherein:

said deformable magnetic recording medium is electrically chargeable and thermoplastically deformable; and said provision of said depressions includes the steps of establishing on said magnetic recording medium a pattern of electric charges representative of said information, and heating said magnetic recording medium to enable said electric charges to depress selectively portions of said magnetic recording medium.

9. A method as claimed in claim 6, wherein:

said magnetic recording medium is selectively softenable; and said depressions are formed by softening portions of said magnetic recording medium representative of said information and by subjecting said magnetic recording medium to magnetic fields so as to depress said softened portions.

10. A method as claimed in claim 6, wherein:

said magnetic recording medium is electrically chargeable and thermoplastically deformable; and said provision of said depressions includes the steps of electrically charging said magnetic recording medium, establishing a pattern of heat gradients representative of said information, and exposing said electrically charged magnetic recording medium to said pattern of heat gradients to enable electric charges on said magnetic recording medium to depress selectively portions of said magnetic recording medium.

11. A method as claimed in claim 6, wherein:
said deformable magnetic recording medium is electrically chargeable and thermoplastically deformable;
said provisions of said depressions includes the steps of electrically charging said magnetic recording medium, establishing a pattern of heat gradients representative of said information, exposing said electrically charged magnetic recording medium to said pattern of heat gradients to enable electric charges on said magnetic recording medium to depress selectively portions of said magnetic recording medium, and cooling said magnetic recording medium to fix said depressions in said magnetic recording medium; and
said establishment of said magnetic record includes the step of subjecting said magnetic recording medium to an alternating magnetic field decaying in a direction toward portions of said magnetic recording medium below said depressions, so that portions of said magnetic recording medium between said depressions are stronger magnetized than said portions below said depressions.

12. A method as claimed in claim 6, wherein:
said depressions are formed in said magnetic recording medium with the aid of a pattern of magnetic gradients representative of said information.

13. A method as claimed in claim 6, wherein:
said deformable magnetic recording medium is provided by combining magnetizable particles with a photovoltaic thermoplastic medium; and
said depressions are provided with the assistance of electric charges set up by photovoltaic action of said thermoplastic medium.

14. A method as claimed in claim 6, wherein:
said magnetic record is established by subjecting said magnetic recording medium after provision of said depressions to an alternating magnetic field decaying in a direction toward said portions of said magnetic recording medium below said depressions.

15. A method as claimed in claim 14, including the step of:
printing out said magnetic record with the assistance of magnetically attracted toner.

16. A method as claimed in claim 14, including the steps of:
providing a further magnetic recording medium; and
establishing on said further magnetic recording medium a magnetic copy of said magnetic record.

17. A method as claimed in claim 16, including the step of:
printing out said magnetic copy of said magnetic record from said further magnetic recording medium with the assistance of magnetically attracted toner.

18. A method of recording an image, comprising in combination the steps of:
providing a deformable, electrically chargeable and photoconductive magnetic recording medium;
exposing said magnetic recording medium to electric charges and to said image to provide on said magnetic recording medium a pattern of electric charges corresponding to said image;
enabling said electric charges to deform portions of said magnetic recording medium corresponding in distribution to said pattern of electric charges; and
magnetizing said deformed portions differently from other portions of said magnetic recording medium so as to establish a magnetic record of said image.

19. A method as claimed in claim 18, wherein:
said magnetic recording medium is cooled prior to the establishment of said magnetic record to fix said deformed portions in said magnetic recording medium; and
said magnetic record is established by subjecting said magnetic recording medium to an alternating magnetic field decaying as a function of distance.

20. A method as claimed in claim 18, wherein:
said magnetic recording medium is provided by dispersing ferromagnetic particles in a thermoplastic photoconductor.

21. A method as claimed in claim 18, wherein:
said magnetic recording medium is composed of a thermoplastic photoconductive sheet having ferromagnetic particles incorporated therein.

22. A method as claimed in claim 18, including the step of:
printing out said magnetic record with the assistance of magnetically attracted toner.

23. A method as claimed in claim 18, wherein:
said magnetic recording medium is provided by incorporating ferromagnetic particles capable of retaining a magnetic moment upon magnetization thereof in a thermoplastic sheet, and combining a sheet-like photoconductor with said thermoplastic sheet.

24. A method as claimed in claim 23, wherein:
said thermoplastic sheet is selectively removable from said sheet-like photoconductor; and
said pattern of electric charges is provided by a charge transfer process operating on said photoconductor and on said thermoplastic sheet.

25. A method as claimed in claim 18, including the steps of:
providing a further magnetic recording medium; and
establishing on said further magnetic recording medium a magnetic copy of said magnetic record.

26. A method as claimed in claim 25, including the step of:
printing out said magnetic copy of said magnetic record from said further magnetic recording medium with the assistance of magnetically attracted toner.

27. Apparatus for recording information, comprising in combination:
a thermoplastically deformable magnetic recording medium capable of retaining a magnetic moment upon magnetization thereof;
means for providing physical deformation forces for deforming portions of said magnetic recording medium and means for providing in said magnetic recording medium with said deformation forces by thermoplastic deformation deformed portions representative of said information; and
means for magnetizing said deformed portions of said magnetic recording medium differently from other portions of said magnetic recording medium so as to establish a magnetic record of said information, said magnetizing means include means distinct from said deformation force providing means for generating an alternating magnetic field decaying as a function of distance, and means for applying said alternating magnetic field to said magnetic recording medium having said deformed portions.

28. Apparatus as claimed in claim 27, including:

means for printing out said magnetic record with the assistance of magnetically attracted toner.

29. Apparatus as claimed in claim 27, wherein:
said deformable magnetic recording medium comprises a photovoltaic thermoplastic medium and magnetizable particles; and
said means for providing said deformed portions include means for providing an image of said information, exposing said photovoltaic thermoplastic medium to said image, and softening said photovoltaic thermoplastic medium.

30. Apparatus as claimed in claim 27, including:
a further magnetic recording medium; and
means operatively associated with said further magnetic recording medium for establishing on said further magnetic recording medium a magnetic copy of said magnetic record.

31. Apparatus as claimed in claim 30, including:
means operatively associated with said further magnetic recording medium for printing out said magnetic copy of said magnetic record with the assistance of magnetically attracted toner.

32. Apparatus for recording information, comprising in combination:
a thermoplastically deformable magnetic recording medium capable of retaining a magnetic moment upon magnetization thereof;
means for providing physical deformation forces for deforming portions of said magnetic recording medium and means for providing in said magnetic recording medium with said deformation forces by thermoplastic deformation depressions representative of said information; and
means distinct from said deformation providing means for establishing a magnetic record of said information by magnetizing portions of said magnetic recording medium between said depressions stronger than portions of said magnetic recording medium below said depressions.

33. Apparatus as claimed in claim 32, including:
a further magnetic recording medium; and
means operatively associated with said further magnetic recording medium for establishing on said further magnetic recording medium a magnetic copy of said magnetic record.

34. Apparatus as claimed in claim 32, wherein:
said means for providing said depressions include means for providing a pattern of magnetic gradients representative of said information and means for providing said depressions with the aid of said pattern of magnetic gradients.

35. Apparatus as claimed in claim 32, wherein:
said magnetic recording medium is electrically chargeable; and
said means for providing said depressions include means for establishing on said magnetic recording medium a pattern of electric charges representative of said information, and means for enabling said electric charges to depress selectively portions of said magnetic recording medium.

36. Apparatus as claimed in claim 32, wherein:
said magnetic recording medium is selectively softenable; and
said means for providing said depressions include means for softening portions of said magnetic recording medium representative of said information, and means for providing magnetic fields contracting said softened portions.

37. Apparatus as claimed in claim 32, wherein:
said deformable magnetic recording medium comprises a photovoltaic thermoplastic medium and magnetizable particles; and
said means for providing said depressions include means for causing electric charge patterns corresponding to said information to be set up in said thermoplastic medium and for causing said depressions with the aid of said electric charge patterns.

38. Apparatus as claimed in claim 32, wherein:
said means for establishing a magnetic record of said information include means for generating, and for subjecting said magnetic recording medium to, an alternating magnetic field decaying in a direction toward said portions of said magnetic recording medium below said depressions.

39. Apparatus as claimed in claim 38, including:
means for printing out said magnetic record with the assistance of magnetically attracted toner.

40. Apparatus as claimed in claim 38, wherein:
said magnetic recording medium is electrically chargeable and thermoplastically deformable; and
said means for providing said depressions include means for electrically charging said magnetic recording medium, means for establishing a pattern of heat gradients representative of said information and for exposing said electrically charged magnetic recording medium to said pattern of heat gradients to enable electric charges on said magnetic recording medium to depress selectively portions of said magnetic recording medium, and means for cooling said magnetic recording medium to fix said depressed portions in said magnetic recording medium prior to said subjection to said alternating magnetic field.

* * * * *